United States Patent [19]

Burton

[11] Patent Number: 5,230,658
[45] Date of Patent: Jul. 27, 1993

[54] DRIVESHAFT WITH SLIP JOINT SEAL

[76] Inventor: Robert A. Burton, 3426 Bay Highland Dr., Green Bay, Wis. 54311

[21] Appl. No.: 864,307

[22] Filed: Apr. 6, 1992

[51] Int. Cl.⁵ .......................... F16C 1/24; F16D 3/06
[52] U.S. Cl. ...................... 464/16; 464/133; 464/162
[58] Field of Search ............... 464/16, 133, 157, 162, 464/172, 183

[56] References Cited

U.S. PATENT DOCUMENTS

| | | | |
|---|---|---|---|
| 1,496,236 | 6/1924 | Laughlin | 464/16 |
| 2,072,090 | 3/1937 | Andersen | 464/16 |
| 2,107,721 | 2/1938 | Swensen | 464/16 |
| 2,116,290 | 5/1938 | Spicer | 464/172 X |
| 2,239,192 | 4/1941 | Cutting | 464/133 X |
| 3,016,722 | 1/1962 | Batdorf | 464/16 |
| 3,075,370 | 1/1963 | Kings | 464/133 X |
| 3,123,990 | 3/1964 | Freeman | 464/16 |
| 3,234,758 | 2/1966 | Lewis | 464/16 |
| 3,367,142 | 2/1968 | Groves et al. | 464/162 |
| 3,633,383 | 1/1972 | Kleinschmidt | 464/16 |
| 3,942,336 | 3/1976 | Schultenkämper | 464/16 X |
| 4,125,000 | 11/1978 | Grob | 464/162 |
| 4,308,729 | 1/1982 | Condon | 464/16 |
| 4,379,707 | 4/1983 | Fisher | 464/162 |
| 4,592,556 | 6/1986 | Nieman et al. | 464/133 X |
| 4,819,755 | 4/1989 | Smemo et al. | 464/16 |

Primary Examiner—Daniel P. Stodola
Assistant Examiner—William G. Battista, Jr.
Attorney, Agent, or Firm—Allen D. Gutchess, Jr.

[57] ABSTRACT

A slip joint seal for a driveshaft is between two universal joint yokes. A male splined shaft rotates with a first yoke and a female splined shaft rotates with a second yoke, with the two being mechanically engaged for slidable but nonrotational movement during operation of the driveshaft. A sealing sleeve extends from the first yoke around the male splined shaft and is of a larger diameter than the female splined shaft. The female splined shaft has a first outwardly-facing, annular seal at its outer end, away from the second yoke, which seal engages the inner surface of the sealing sleeve. A propeller shaft is affixed to the end of the female splined shaft toward the second yoke and to the second yoke, preferably being of the same diameter as the sleeve. A second annular seal which is the same size and the first one is carried by an end of the male splined shaft beyond the female shaft. The second seal engages the inner surface of the propeller shaft. The female splined shaft also has a grease fitting for supplying grease to the shafts between the two annular seals. Splines and grooves of the male and female shafts are designed to enable grease to readily move past them.

18 Claims, 2 Drawing Sheets

DRIVESHAFT WITH SLIP JOINT SEAL

This invention relates to a slip joint grease seal for a driveshaft.

Slip joint seals have been long known in the art. The slip joint comprises male and female splined shafts which connect between two universal joint yokes. They are rotatably connected but can slide relative to one another to accommodate differences in length of the driveshaft during operation. Various seals have been employed to maintain grease between the splined shafts. With one common type of seal heretofore employed, the male splined shaft is exposed to the elements when the universal joints are at extended positions, with contaminants, including water, then being carried back between the two shafts as the driveshaft contracts. Other seals have been overly complex, and inefficient and/or tend to wear out relatively quickly.

The seal in accordance with the invention is used with a slip joint which is between two universal joint yokes in a driveshaft which contracts and extends during operation of a vehicle with which it is used. A males splined shaft extends rearwardly from a first universal joint yokes and rotates therewith. A female splined shaft extends rearwardly of a second universal joint yoke, rotates therewith, and is mechanically engaged for slidable but nonrotatable movement with the male splined shaft for all positions of the driveshaft and the yokes. A sealing sleeve extends rearwardly of the first universal joint yoke and rotates therewith, being suitably affixed thereto. The sealing sleeve has an outer diameter exceeding the outer diameter of the female splined shaft which extends into an annular chamber formed between the male splined shaft and the sealing sleeve. The female splined shaft carries an outwardly-facing, annular sealing ring in a groove, at its outer end away from the second universal joint yoke. The sealing ring includes a base band under tension in the groove, with an outwardly-extending lip slanting toward the second universal joint yoke and engagable with the inner surface of the sealing sleeve for all operational positions of the two universal joint yokes. The slanted lip enables excess grease in the annular chamber to pass by it and be expelled through an outer open end of the sleeve beyond the seal. The slanted lip also acts as a wiper to remove contaminants, including moisture, from the inner surface of the sealing sleeve when the driveshaft moves toward an extended position.

The female splined shaft has an inner annular recess at an end portion toward the second universal joint yoke and beyond the internal splines thereof. A grease fitting is also carried by the female splined shaft, preferably communicating with the annular recess between the internal splines and the end of the shaft. A propeller shaft or tubular member also is affixed to the same end portion of the female splined shaft and to the second universal joint yoke. The propeller shaft and the sealing sleeve preferably are of the same diameter to reduce the number of different components required to be carried in inventory. The length of the sealing sleeve, the propeller shaft, and the male splined shaft can be varied according to the particular requirements.

The end of the male splined shaft toward the second universal joint yoke extends beyond the female splined shaft for all operational positions of the two universal joint yokes. It carries a piston which is suitably affixed to the end of the male splined shaft, as by a machine screw. The piston has a groove in which is carried a second sealing ring of the same size and shape as the first one. It includes a base band under tension in the groove with an outwardly-extending lip slanted toward the first universal joint yoke, in this instance, and engagable with the inner surface of the propeller shaft for all operating positions.

With the first sealing ring being affixed to the female splined shaft and the second sealing ring being affixed to the male splined shaft, the space containing grease remains under substantially constant volume as the universal joint yokes and the splined shafts move toward and away from one another. This space includes the annular chamber between the male splined shaft and the sealing sleeve and, at the other end, between the male splined shaft and propeller shaft.

The size and shape of the splines and grooves of the male and female splined shaft are designed such that space exists between the bottoms of the grooves and the peaks of the splines. This provides a ready passage for grease therebetween as it moves from one annular chamber to the other as the universal joint yokes move toward and away from one another and the male and female splined shafts move accordingly. Thus, grease is supplied exactly where it is needed, between the two engaged portions of the splined shafts.

It is therefore, a principal object of the invention to provide an improved slip joint for a driveshaft having the many objects and advantages discussed above.

Many other objects and advantages of the invention will be apparent from the following detailed description of a preferred embodiment thereof, reference being made to the accompanying drawings; in which.

Figure 1:
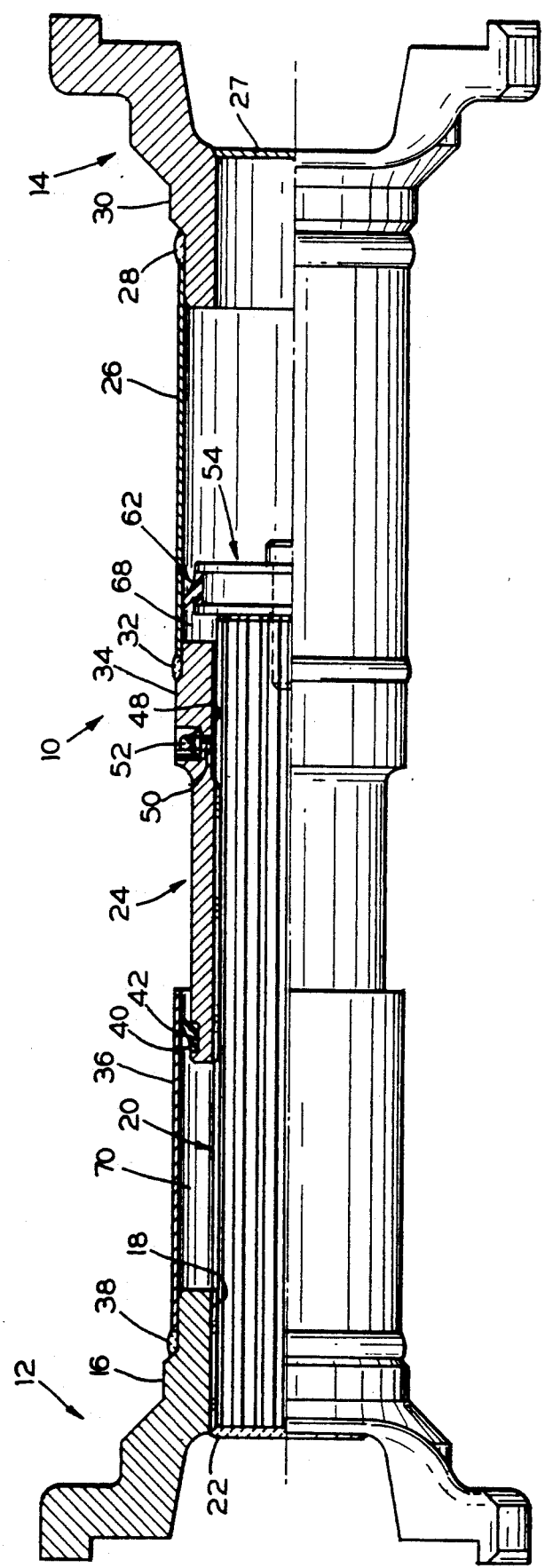
FIG. 1 is a longitudinal view, half in elevation and half in longitudinal cross section, of a driveshaft employing a slip joint in accordance with the invention.

Referring to the drawings, and more particularly to FIG. 1, a driveshaft embodying the invention is indicated at 10 and connects a first universal joint yoke 12 and a second universal joint yoke 14. The yokes can be of various designs to accommodate particular universal joint crosses of particular styles. The universal joint yoke 12 includes a hub 16 having an internally-splined central passage 18. A male splined shaft 20 extends rearwardly of the first yoke 12 and rotates therewith. In this instance, the splined shaft 20 is engaged with internal splines of the passage 18 and is welded at 22 to the hub 18. The splined shaft 20 is of predetermined length which can vary considerably from application to application. Other means can be employed to affix the shaft to the yoke and in some instances they can be structurally integral.

A female splined shaft 24 extends rearwardly of the second universal joint yoke 14 and rotates therewith. In this instance, the female splined shaft 24 is affixed to the yoke 14 through a propeller shaft or tube 26 which is welded at 28 to a solid yoke hub 30 and welded at 32 to an end portion 34 of the female splined shaft 24. Means 27 closes off an end portion of the shaft 24 closer to the second universal joint yoke 14. The length of the propeller shaft also can vary considerably from application to application.

The seal in accordance with the invention includes a sealing sleeve 35 extending rearwardly of the first universal joint yoke 12 and being rotatable therewith. In this instance, the sleeve 36 is affixed to the hub 16 of the yoke by a weld 38 at the end of the sleeve. The sealing sleeve 36 has an internal diameter exceeding the outer diameter of the female splined shaft 24 and has a sufficient length such that the splined shaft 20 will not be exposed and the outer end portion of the female splined shaft will always be within the sealing sleeve 36 for any operating position of the driveshaft 10.

Figure 2:
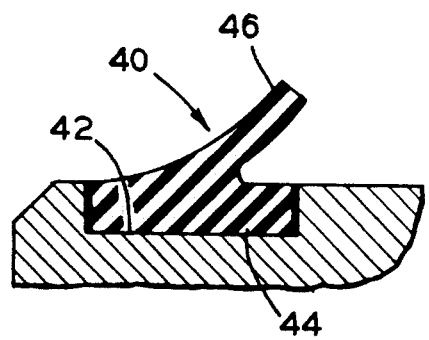
FIG. 2 is an enlarged view in transverse cross section of a sealing ring employed in the slip joint of FIG. 1.

The seal in accordance with the invention includes a sealing ring 40 carried in an external annular groove 42 at an outer end of the female splined shaft 24 opposite the second universal joint yoke 14. The sealing ring 40 includes an annular base band 44 (FIG. 2) and a lip 46 extending outwardly therefrom and slanting toward the second universal joint yoke 14. With this arrangement of the lip 46, any excess grease can pass the lip 46 toward the open end of the sleeve 36. Further, when the driveshaft 10 is moving toward the expanded condition, the lip 46 is effective to wipe any contaminants off the inner surface of the sleeve 36, which is relatively clean and never exposed directly to the elements. The sealing ring 40 is somewhat resilient so that the base band 44 can be stretched over the end of the shaft 24 and resiliently held under tension in the bottom of the external groove 42. The resiliency also enables the lip 46 to maintain uniform contact with the inner surface of the sleeve 36. By way of example, the sealing ring 40 can be made of carboxylated nitrile material with a hardness in the order of eighty-five durometers (Shore A).

With the sealing ring 40 externally mounted on the shaft 24, it only contacts the inner surface of the sleeve 36 and is never in contact with a surface of a shaft which is sometimes exposed to the elements and on which contaminants and water can be deposited.

The female splined shaft 24 has an inner annular recess 48 at the end 34 beyond the internal splines. A transverse bore 50 communicates with a portion of the annular recess 48 and can receive a supply of grease from a grease gun or the like and force it in both directions.

Figure 3:
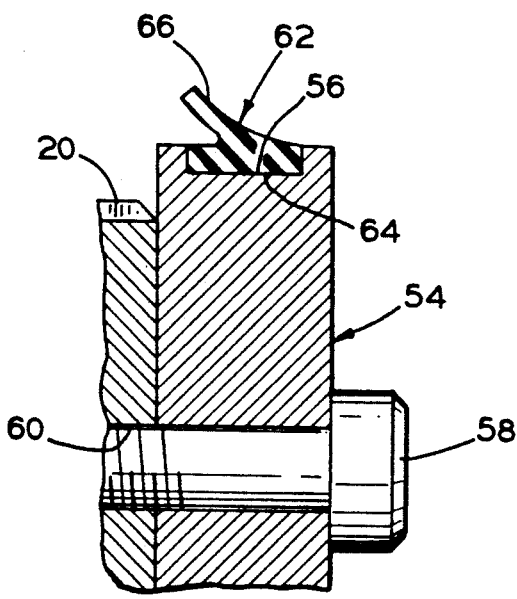
FIG. 3 is an enlarged view of a second sealing ring and a piston employed in the slip joint of FIG. 1.

A cylindrical body or piston 54 with an external groove 56 (FIG. 3) is affixed to the end of the male splined shaft 20 which is closer to the yoke 14 by a machine screw 58 received in a threaded bore 60 centrally positioned in the shaft. The sealing ring 62 also has a base band 64 and a lip 66, with the lip preferably facing toward the yoke 12 to better retain grease. The sealing ring can be stretched over the piston with the base band 64 held in tension in the bottom of the groove 56. In a preferred form, the sleeve 36 and the tube 26 are of the same diameter to reduce inventory parts. This also enables the sealing ring 62 to be of the same size and shape as the sealing ring 40 so that the one ring serves both purposes. The sealing ring 62 can also be made of the same material as the sealing ring 40. The lip 66 of the sealing ring 62 always engages the inner surface of the tube 26 and is never exposed to outside elements, including contaminants and water.

An annular grease chamber 68 is formed beyond the female splined shaft 24 by the tube 26, the female shaft end 34, the piston 54 and the sealing ring 62, and the male splined shaft 20. Likewise, an annular grease chamber 70 is formed at the other end of the female splined shaft 24 between the sleeve 36, the yoke hub 16, the sealing ring 40, and the male splined shaft 20. The volumes of the chambers 68 and 70 vary as the yokes 12 and 14 move toward and away from one another. However, the volume of one of the chambers 68 and 70 increases as the other decreases so that the total volume remains substantially constant. Initially, both of the chambers 68 and 70 are filled with grease supplied through the fitting 52, the bore 50, the recess 48, and between the teeth or splines and the groove of the shafts 20 and 24. The grease is forced back and forth between the chambers 68 and 70 as the effective length of the driveshaft increases and decreases. This grease is supplied between the engaged splines and grooves so that it is available exactly where it is needed most. The combined volumes of the chambers 68 and 70 can provide several times the capacity of driveshaft seals heretofore commonly used.

Figure 4:
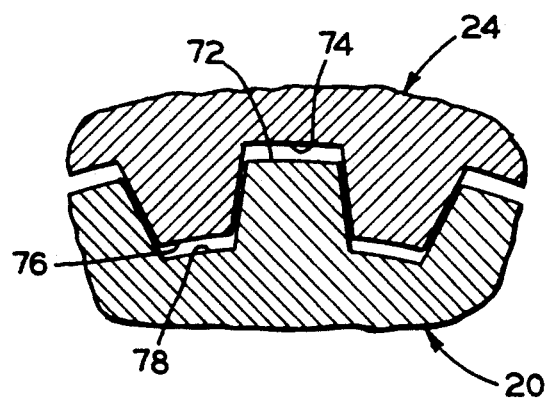
FIG. 4 is an enlarged view in transverse cross section of splines and grooves of male and female splined shafts of the slip joint.

The splines and grooves of the shafts are designed to enable grease to pass between tips of the splines and the bottoms of the grooves, as shown in FIG. 4. Here, tips of splines 72 of the male splined shaft 20 stop short of the bottoms of grooves 74 of the female splined shaft 24. Likewise, tips of splines 76 of the female splined shaft 24 stop short of the bottoms of grooves 78 of the male splined shaft 20. At the same time, however, the sides of the teeth and grooves are substantially fully engaged to still provide proper contact area therebetween.

The basic design of the driveshaft sealing arrangement in accordance with the invention is compatible with substantially any manufacturers' series of universal joints and driveshafts presently in use.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A driveshaft comprising a first universal joint yoke, a second universal joint yoke spaced at a varying distance from said first universal joint yoke when said driveshaft is in operation, a first shaft affixed to said first universal joint yoke and extending toward said second universal joint yoke from said first universal joint yoke and rotatable therewith, a second shaft affixed to said second universal joint yoke and extending toward said first universal joint yoke from said second universal joint yoke and rotatable therewith, engaging means for said shafts to enable said shafts to be in mechanical engagement for all operating positions of said first and said second universal joint yokes to enable longitudinally slidable but nonrotatable movement between said shafts, means closing off an end portion of said second shaft closer to said second universal joint yoke, a sleeve affixed to said first universal joint yoke and extending toward said second universal joint yoke from said first universal joint yoke and extending over at least a substantial portion of said first shaft, and having a diameter greater than an outer diameter of said second shaft, said sleeve extending around said first shaft and around an end portion of said second shaft away from said second universal joint yoke and having an open end away from said first universal joint yoke, a first resilient seal carried by the end portion of said second shaft away from said second yoke, said seal having an annular lip facing outwardly and slanted toward said second universal joint yoke, said lip engaging an inner surface of said sleeve for all operating positions of said first and said second universal joint yokes, said lip enabling grease in an annular chamber formed between said first shaft and said sleeve to pass by said seal toward the open end of said sleeve, said lip serving to wipe contaminants off the inner surface of said sleeve when said first and said second universal joint yokes move away from one another, said second shaft having an annular recess at the end toward said second universal joint yoke, a cylindrical member with an annular groove affixed to an end of said first shaft beyond said second shaft toward said second universal joint yoke, a tubular member connecting said second shaft and said second universal joint yoke, and a second resilient seal in said annular groove of said cylindrical member and engaging the inner surface of said tubular member for all operating positions of said first and said second universal joint yokes, and a grease fitting in said second shaft spaced toward said second universal joint yoke from said second seal.

2. A driveshaft according to claim 1 wherein said sleeve and said tubular member have the same diameter.

3. A driveshaft according to claim 2 wherein said first resilient seal and said second resilient seal have lips with the same maximum diameters.

4. A driveshaft according to claim 1 wherein said first shaft has external splines and said second shaft has internal splines which are in mechanical engagement for all operating positions of said first and said second universal joint yokes.

5. A driveshaft according to claim 4 wherein said splines of each of said shafts engage grooves of the other of said shafts and stop short of the bottoms of the grooves to provide grease passages therebetween.

6. A driveshaft comprising a first universal joint yoke, a second universal joint yoke spaced at a varying distance from said first universal joint yoke when said driveshaft is in operation, a male splined shaft affixed to said first universal joint yoke and extending toward said second universal joint yoke from said first universal joint yoke and rotatable therewith, a female splined shaft affixed to said second universal joint yoke and extending toward said first universal joint yoke from said second universal joint yoke and rotatable therewith, the splines of said male and said female splined shafts being in mechanical engagement for all operating positions of said first and said second universal joint yokes with an end of said male splined shaft extending beyond said female splined shaft, a cylindrical sleeve affixed to said first universal joint yoke and extending toward said second universal joint yoke from said first universal joint yoke and having a diameter greater than an outer diameter of said female splined shaft, said sleeve extending around said male splined shaft and around an end portion of said female splined shaft away from said second universal joint yoke for all operating positions of said driveshaft, said sleeve having an open end away from said first universal joint yoke, said female splined shaft having an outwardly-facing, annular groove at the end portion away from said second universal joint yoke, a first seal, said seal having a base band under tension in said groove and having an annular lip extending outwardly, said lip engaging an inner surface of said sleeve for all operating positions of said driveshaft, said lip serving to wipe contaminants off the inner surface of said sleeve when said first and said second universal joint yokes move away form one another, said female splined shaft having an annular recess at the end toward said second universal joint yoke and beyond internal splines therein, a tubular member connecting said female splined shaft and said second universal joint yoke, and a second seal affixed to the end of said male splined shaft beyond said female splined shaft toward said second universal joint yoke, said second seal engaging the inner surface of said tubular member for all operating positions of said first and said second universal joint yokes.

7. A driveshaft according to claim 6 wherein said sleeve and said tubular member have the same diameter.

8. A driveshaft according to claim 7 wherein said first seal and said second seal have lips with the same maximum diameters.

9. A driveshaft according to claim 6 wherein said splines of each of said shafts engage grooves of the other of said shafts and stop short of the bottoms of the grooves to provide grease passages therebetween.

10. A driveshaft comprising a first universal joint yoke, a second universal joint yoke spaced at a varying distance from said first universal joint yoke when said driveshaft is in operation, a male splined shaft affixed to said first universal joint yoke and extending toward said second universal joint yoke from said first universal joint yoke and rotatable therewith, a female splined shaft affixed to said second universal joint yoke and extending toward said first universal joint yoke from said second universal joint yoke and rotatable therewith, the splines of said male and said female splined shafts being in mechanical engagement for all operating positions of said first and said second universal joint yokes with an end of said male splined shaft extending beyond said female splined shaft, a sleeve affixed to said first universal joint yoke and extending toward said second universal joint yoke from said first universal joint yoke and rotatable therewith, said sleeve having a diameter greater than an outer diameter of said female splined shaft and extending around an end portion of said female splined shaft away from said second universal joint yoke for all positions of said first and said second universal joint yokes, a first resilient seal carried by the end portion of said female splined shaft away from said second yoke, said seal engaging an inner surface of said sleeve for all operating positions of said first and said second universal joint yokes, a tubular member connecting said female splined shaft and said second universal joint yoke, and a second resilient seal carried at the end of said male splined shaft and engaging the inner surface of said tubular member for all operating positions of said universal joint yokes.

11. A driveshaft according to claim 10 wherein a grease fitting is in said female splined shaft spaced toward said second universal joint yoke from said first seal.

12. A driveshaft according to claim 11 wherein said female splined shaft has a smooth cylindrical recess facing inwardly at the end toward said second universal joint yoke, said grease fitting communicating with said cylindrical recess.

13. A driveshaft according to claim 10 wherein said first seal has an annular lip extending outwardly and slanted toward said second universal joint yoke, said lip serving to wipe contaminants off the inner surface of said sleeve when said first and said second universal joint yokes move away from one another.

14. A driveshaft according to claim 13 wherein said second seal has an annular lip extending outwardly and slanted toward said first universal joint yoke.

15. A driveshaft according to claim 10 wherein said second seal has an annular lip extending outwardly and slanted toward said first universal joint yoke.

16. A driveshaft according to claim 10 wherein said sleeve and said tubular member have the same diameter.

17. A driveshaft according to claim 16 wherein said first resilient seal and said second resilient seal have lips with the same maximum diameters.

18. A driveshaft according to claim 10 wherein said splines of each of said shafts engage grooves of the other of said shafts and stop short of the bottoms of the grooves to provide grease passages therebetween.

* * * * *